United States Patent

Anderson

[11] Patent Number: 5,885,610
[45] Date of Patent: Mar. 23, 1999

[54] BY-PASS RUMEN PRODUCT

[75] Inventor: Michael D. Anderson, Eden Prairie, Minn.

[73] Assignee: Zinpro Corporation, Eden Prairie, Minn.

[21] Appl. No.: 810,047

[22] Filed: Mar. 4, 1997

[51] Int. Cl.$^6$ .................................................. A23K 1/00
[52] U.S. Cl. .................... 424/438; 424/442; 424/489; 514/562; 514/564; 426/807
[58] Field of Search .................... 424/442, 438, 424/489, 682; 426/807; 514/554, 556, 561, 562, 564

[56] References Cited

U.S. PATENT DOCUMENTS

| | | | |
|---|---|---|---|
| 2,833,821 | 5/1958 | Hause | 260/534 |
| 3,463,858 | 8/1969 | Anderson | 424/289 |
| 3,541,204 | 11/1970 | Tibbald et al. | 424/438 |
| 3,857,971 | 12/1974 | Abdo et al. | 426/53 |
| 3,925,433 | 12/1975 | Abdel-Monem et al. | 260/438.5 R |
| 3,928,506 | 12/1975 | Gobert et al. | 260/924 |
| 3,941,818 | 3/1976 | Abdel-Monem | 260/429.9 |
| 3,950,372 | 4/1976 | Abdel-Monem | 260/429 R |
| 4,021,569 | 5/1977 | Abdel-Monem | 424/289 |
| 4,067,994 | 1/1978 | Anderson et al. | 424/295 |
| 4,670,269 | 6/1987 | Abdel-Monem | 426/74 |
| 4,678,854 | 7/1987 | Abdel-Monem | 556/149 |
| 4,764,633 | 8/1988 | Anderson et al. | 556/50 |
| 4,900,561 | 2/1990 | Abdel-Monem et al. | 426/2 |
| 5,061,815 | 10/1991 | Leu | 556/118 |
| 5,278,329 | 1/1994 | Anderson | 556/50 |
| 5,556,634 | 9/1996 | Moore | 424/438 |
| 5,571,527 | 11/1996 | Nishimura et al. | 424/438 |
| 5,585,134 | 12/1996 | Cummings et al. | 426/630 |
| 5,631,031 | 5/1997 | Meade | 426/2 |

FOREIGN PATENT DOCUMENTS

| | | |
|---|---|---|
| 0781512 | 7/1997 | European Pat. Off. . |
| 63955724 | 12/1963 | France . |

OTHER PUBLICATIONS

Iordanova—Vetmednauki 17(2) 1981 8–11 Influenza of Various Lyionet Methiodnino AMTS on Pig Gain and Blood Picture.

West et al Textbook of Biochemistry 1966: pp. 280, 265.

Merrk Veterinary Manual 1993 pp. 1192, 1193, 1198–1203, 1206, 1207, 1218–1221, 1323–1325.

*Primary Examiner*—Neil S. Levy
*Attorney, Agent, or Firm*—Zarley, McKee, Thomte, Voorhees & Sease

[57] ABSTRACT

A method and composition which is rumen stable but intestine soluble, and therefore useful in dietary supplementation of ruminant animals with bioavailable but rumen stable forms of essential amino acids.

5 Claims, No Drawings

BY-PASS RUMEN PRODUCT

FIELD OF THE INVENTION

This invention relates to a rumen stable bioavailable dietary supplement for ruminant animals in order to provide in bioavailable form essential amino acids.

BACKGROUND OF THE INVENTION

It is well known that ruminants are in need of bioavailable essential amino acids in order to perform well as domesticated livestock. In this regard, if the animal, for example a dairy cow, does not have its minimum requirements of essential amino acids such as lysine and methionine, the animal will not produce milk at optimum yield, and its health will generally decline.

Providing essential amino acids to ruminants is not as simple as it sounds. For example, the bacteria in the rumen of a cow are known to routinely degrade amino acid sources, like lysine and methionine. Put another way, the bacteria in the rumen metabolize the amino acid source and thus "rob" the animal of the benefit of the amino acid. By the time metabolized byproduct passes from the rumen into the intestine, the amino acid is gone. The challenge, therefore, is to develop products which will allow the amino acid to be stable in the rumen, but capable of absorption when it passes from the rumen into the intestine. In other words, the essential amino acids, such as lysine and methionine, are bioavailable only in the intestine, but remain stable and therefore not metabolized in the rumen.

In the past, this problem has been recognized, and feed developers have used fats, minerals, carbohydrates and binders to protect amino acids from rumen degradation. This technology involves simple coating of the material in hopes that the coated amino acid is rumen stable. Recently, Rhone Poulenc has provided a pH-sensitive polymer coating. The theory of a pH-sensitive polymer coating for the amino acid revolves around the pH differential between the rumen and the intestine. The rumen, for example, typically has a pH of 6.5 to 7.0, and the intestine a pH of 2–3. The theory of polymer-coated essential amino acids is that something which is stable as a coating at 6.5 to 7.0 (the rumen pH), but will solubilize at more acid pH's of the intestine (pH 2–3), should be stable in the rumen, but available in the intestine.

Both technologies used in the past, i.e. coatings, such as fat coatings, and the more recently developed pH-sensitive polymer coatings, have met with limited success and have some problems. The primary problem with any product relying upon coatings of any kind for rumen stability is that the coating can become abraded during handling and during chewing by the animal. If the process handler disturbs the coating, then the amino acid becomes available to microbes in the rumen and consumed, and therefore wasted by the animal. Likewise, if the animal abrades the coating during chewing, it then becomes available in the rumen for rumen bacteria to metabolize, and is therefore also wasted to the animal. Additionally, fat-protected or coated essential amino acids rely upon the fat resistance to enzymes in the rumen that are capable of digesting the protective fat coat, and, on the other hand, the ability of digestion by enzymes post-rumenally. However, if there is not a proper balance between resistance to attack in the rumen and digestion intestine, then the amino acid benefit to the animal may be lost.

From the above description, it can be seen that there is a real and continuing need for the development of products for delivery of essential amino acids to ruminant animals in a form that allows the material to be rumen stable, i.e. resistant to degradation in the rumen, but yet after delivery from the rumen to the intestine, highly absorbable and bioavailable in the intestine. It is a primary objective of this invention to fulfill this need safely, effectively, efficiently and at low cost.

Another objective of the present invention is to provide compounds which are stable to rumen environment which do not rely upon any coating or pH-sensitive material for the stability in the rumen, and therefore are not subject to risks of handling or abrasion of the coating during chewing to wear away the coating that is needed to provide rumen stability, but intestine absorbability.

A further object of the invention is to provide a rumen-stable form of essential amino acids such as lysine and methionine which relies upon the properties of chemical bonding between the metals calcium and magnesium, and the amino acids to provide rumen stability, but intestine absorbability.

A yet further objective of the present invention is to m: provide a method of dietary supplementation of ruminant animals which provides an intestine bioavailable form of essential amino acids which is also rumen stable.

The method and means of accomplishing each of these objectives will become apparent from the detailed description of the invention which follows.

SUMMARY OF THE INVENTION

A method has been found to protect crystalline amino acids such as lysine or methionine from degradation in the rumen when orally administered to ruminant animals and which is beneficial to ruminants after passing from the rumen and reaching the abomasum and/or intestines. More particularly, this invention protects the crystalline amino acid such as lysine or methionine from bacterial degradation in the rumen due to a chemical bond, formed between calcium or magnesium and an essential amino acid or acids. The bond is surprisingly resistant to degradation by bacterial microbes in the rumen. The compounds are 1:1 and 1:2 calcium and magnesium salts of essential amino acids.

DETAILED DESCRIPTION OF THE INVENTION

In the ruminant animal, ingested feed first passes into the rumen where it is partially broken down by bacterial fermentation. During rumen fermentation, rumen microbes utilize nitrogen from nitrogen compounds that they have degraded to form microbial protein. Nitrogen sources for rumen microbes include protein that is degraded in the rumen, rumen degradable peptides, free amino acids such as crystalline amino acids, and urea. Microbial protein and undegraded feed protein pass to the abomasum and small intestine where hydrochloric acid and mammalian enzymes degrade microbial protein and undegraded feed protein to free amino acids and short peptides. The amino acids and short peptides are absorbed in the intestine, and the ruminant animals utilize the amino acids for synthesis of protein to sustain life, grow, reproduce and produce milk. However, if the amino acid has been "used" or metabolized by rumen microbes, its value to the host animal is lost.

Of the twenty or more amino acids utilized by the animal to synthesize proteins, ten are considered to be essential. Examples of the essential amino acids include leucine, isoleucine, valine, methionine, threonine, lysine, histidine, phenylalanine and tryptophan. Essential amino acids are those amino acids which are required in quantities exceeding amounts produced by the animal, and must be supplied by microbial protein or rumen undegraded protein. Amino acids supplied in excess are degraded by the animal and excreted in the form of urea. The process of synthesizing urea from ammonia is a process requiring energy input from the animal. If certain essential amino acids are not provided in adequate amounts, the animal will be limited on the amount and types of protein it can produce, thus limiting animal performance. Supplying the proper amounts of amino acids maximizes animal performance while enhancing efficiency of energy utilization by the animal.

Lysine and methionine are the two most limiting essential amino acids when corn-based rations are fed. Results from studies also indicate that milk protein content is the most sensitive of the production variables (yield of milk, fat-corrected milk, milk protein, milk fat, and content of milk fat and protein) to alterations in amino acid content of duodenal digesta. Researchers have determined, by infusing incremental amounts of the limiting amino acids into the duodenum of lactating dairy cows, that the required contribution of lysine and methionine to total essential amino acids in duodenal digesta for maximum milk protein content approximated 15% and 5.2%, respectively.

A recent review of studies in which supplemental lysine and/or methionine were supplied postrumenally, either by infusion into the duodenum or fed in rumen-protected forms, confirms early research that content of milk protein is the most sensitive of the production variables to alterations in lysine and methionine supply. Socha, M. T., and C. G. Schwab. 1996. Dose-response relationships for duodenal lysine and methionine supplies in relation to lactation responses. J. Dairy Sci. 79: (submitted). However, in the vast majority of the studies summarized, cows were assigned to their respective treatments at four or more weeks of lactation. In other studies where cows were assigned to the perspective treatment at, or before parturition, milk yield increased, on average, 1.96 kg/d. Robert, J. C., J. Mathe, B. Bouza, S. Valentin, and V. Demirdjian, 1996. The effect of protected methionine on dairy cattle fertility. American Dairy Science Society Meeting, Corvallis, Oreg.; Socha, M. T., C. G. Schwab, D. E. Putnam, N. A. Kierstead, N. L. Whitehouse, B. D. Garthwaite, G. A. Ducharme, and J. C. Robert. 1996. Supplementing diets of prepartum and early lactation cows with rumen-stable amino acids. J. Dairy Sci. 79 (submitted); Wu, Z., R. Fisher, and C. E. Polan. 1995. Lactational performance of cows fed low or high RUP during late gestation and Met and Lys in subsequent lactation. J. Dairy Sci. 78 (Suppl. 1):266.

The ruminant animal has two major sources of essential amino acids; microbial protein, and protein that escapes degradation in the rumen. Microbial protein can supply 60% to 80% of the essential amino acid needs of the ruminant animal and has a high intestinal digestibility with a relatively consistent profile of essential amino acids that is similar to milk and meat protein. The profile of essential amino acids for feedstuffs and hence the profile of essential amino acids for protein that escapes degradation in the rumen vary greatly from feedstuff to feedstuff. Byproducts derived from cereal grains tend to be low in lysine and high in methionine. Ingredients derived from legumes tend to be higher in lysine and low in methionine. Unlike microbial protein, the profile of essential amino acids for most feedstuffs is vastly different than the profile of essential amino acids for milk and meat protein.

Only fish meal and microbial protein have both lysine and methionine contents greater than 15% and 5.2% of essential amino acids, respectively. The amount of fish meal that can be fed to dairy cattle is limited due to poor palatability. Blood meal is the only other protein source with a lysine content greater than 15% of essential amino acid. Corn, corn gluten meal, corn distillers' grains with solubles, and sunflower meal all contain more than 5.2% of essential amino acids as methionine. Due to most feedstuffs containing less than 15% of essential amino acids as lysine and 5.2% of essential amino acid as methionine, it is difficult to achieve duodenal supplies for lysine and methionine of 15% and 5.2% of essential amino acids, respectively, without crystalline lysine and methionine.

For reasons earlier discussed, feeding unprotected crystalline lysine and methionine directly to ruminant animals would not increase the supply of absorbable lysine and methionine due to rumen bacteria utilizing free amino acids as a source of nitrogen for synthesis of microbial protein. In order to increase the supply of absorbable amino acids to the ruminant using crystalline amino acids, the crystalline amino acids must be protected from microbial degradation in the rumen so they can pass into the intestine.

Currently, there are several rumen-protected amino acid products on the market. These include Smartamine™ and Mepron®M85. Smartamine™ and Mepron®M85 protect the amino acids from ruminal degradation by encapsulating the amino acid with a material that is resistant to bacterial degradation in the rumen. With Smartamine™, the encapsulation material consists of 3% 2-vinylpyridine-co-styrene plus stearic acid and ethylcellulose. The coating for Mepron®M85 consists of 15% stearic acid, ethylcellulose, starch and ash. With both products, if the encapsulation material is removed or fractured prior to or during feeding, the amino acid is no longer protected from rumen bacteria, and hence the amino acid is used as a nitrogen source by rumen bacteria.

Due to the concerns about compromising the integrity of the encapsulation material during feed manufacture, it is recommended that neither Mepron®M85 or Smartamine™ containing feeds be pelleted. Feed manufacturers are also cautioned against excessive handling of feeds containing Smartamine™ to minimize fracturing or removing the encapsulation material.

In this invention there is provided a rumen-protected amino acid product that utilizes the properties of the compounds themselves, rather than encapsulation for protection. As a result, the product can be included in feeds that are pelleted, and concerns about fracturing or removing the encapsulation during physical handling of feeds containing the rumen-protected amino acid product are eliminated.

The compounds of the present invention can be described as 1:1 and 1:2 calcium and magnesium salts of essential amino acids such as lysine and methionine, which are the preferred embodiments.

It is important to note that the compounds of the present invention are either calcium or magnesium alpha amino acid complexed salts. These complexed salts are to be carefully distinguished from conventional salts such as, for example, magnesium chloride or magnesium sulfate, which contain only an electrostatic traction bond between the cation and the anion. The complexed salts of the present invention, which are either 1:1 or 1:2 calcium or magnesium salts complexed with essential amino acids, differ from conventional salts in that while they have an electrostatic attraction between the cation and the anion, there is also a coordination bond formed between the calcium or magnesium moiety and the amino moiety of the amino acid.

This coordination bond forms a chelate structure which in the case of 1:1 complexed salts is a monodentate, and which in the case of 1:2 complexed salts is a bidentate.

By way of example only, the calcium methionine complexed salts of the monodentate, i.e. the 1:1 calcium methionine complexed salts, have the formula:

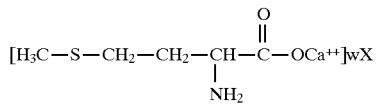

wherein X is an anion and W is an integer equal to the anionic charge of X. The cation of these complexed salts is represented by the bracketed material in the above formula, and represents a 1:1 complex of calcium and methionine. The ligand can be sterically represented as follows:

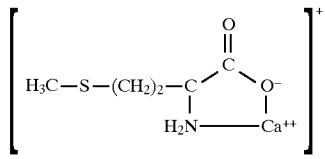

As can be seen from the steric formula, the five-membered ring formation exists when the calcium ion is complexed by coordinate bond with the amine moiety and the electrostatic attraction with the carboxylic acid moiety of the methionine. The complex is formed by a 1:1 ratio of methionine molecules and calcium ions with each calcium ion being complexed with one methionine molecule.

Similar representations can be made by substituting lysine for methionine in the above formula with the exact same type of ligand structures and 1:1 complexes being formed.

By reason of the metal, either calcium or magnesium being divalent, there is a capability of bidentate coordination, i.e. one calcium or magnesium molecule coordinatively associating with two molecules of the negative carboxylate of either lysine or methionine. This can be represented by way of illustration for Ca methionine 1:2 complexes in the following manner:

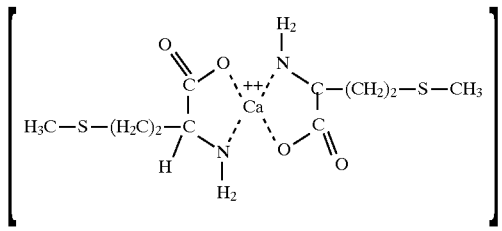

Providing the 1:1 and 1:2 complexes of either calcium and magnesium with essential amino acids has been found to be of great importance in ensuring that the compounds are rumen stable and intestine bioavailable. For reasons not known and not fully understood, apparently the coordination complex bonds between the metals calcium and magnesium and essential amino acids are of just the right bonding strength that they are resistant to metabolism by microbes in the rumen. This allows the compounds to pass through the rumen without the amino acid being consumed in the metabolization process by rumen microbes. On the other hand, when the compounds arrive in the intestine, they are in a form which is capable of absorption through the intestinal wall, and the essential amino acid is therefore available to the animal. Correspondingly and equally important, the calcium and magnesium components are important minerals or metals needed by the animal for its health. Moreover, they are harmless even if excessive amounts are provided. Thus, unlike heavier metals such as zinc, chromium, manganese and the like, the animal's system cannot be overloaded to correspondingly cause adverse effects.

It can be seen from the above description that an important aspect of the present invention is the unique properties of the coordination complexes of essential amino acids with the metals calcium and magnesium. Other metals cannot be used either because they will not form the appropriate strength of coordination bond, or because they will overload the animal if sufficient amounts are used to provide the needed levels of amino acids for the animal. There is, therefore, a unique and surprising relationship, for purposes of the present invention, between calcium and magnesium and essential amino acids.

The following examples are offered to illustrate the preparation of the calcium and magnesium 1:1 and 1:2 salts and to demonstrate their stability in the rumen and, as well, their bioavailability in the intestine.

EXAMPLE 1

A 1:1 calcium lysine complex was prepared according to the following procedure: 235 pounds of lysine HCL was added to 400 pounds water and heated to approximately 200° F. with constant stirring. After the lysine had completely dissolved, 100 pounds of calcium hydroxide containing 52% calcium was slowly added. The calcium hydroxide dissolved in the solution yielding about 735 pounds of solution. The solution was spray dried to yield approximately 285 pounds of calcium lysine complex containing approximately 64% lysine.

EXAMPLE 2

A 1:1 magnesium lysine complex was prepared according to the following procedure: 141 pounds of lysine HCL was added to 300 pounds of water and heated to approximately 200° F. with constant stirring. After the lysine had completely dissolved, 54 pounds of a 50% w/w solution of sodium hydroxide was slowly added with continued stirring. Next, 200 pounds of magnesium sulfate containing 9.8% magnesium was added to the solution with stirring. The result was a clear solution of about 695 pounds. The solution was spray dried to yield 260 pounds of magnesium lysine complex containing approximately 42% lysine.

EXAMPLE 3

A 1:1 calcium lysine complex was prepared according to the following procedure: 235 pounds of lysine HCL was added to 400 pounds of water and heated to 200° F. with constant stirring. After the lysine had completely dissolved, 93 pounds of a 50% w/w solution of sodium hydroxide was slowly added with continued stirring. Next, 190 pounds of calcium chloride containing 28.3% calcium was added to the solution with continued stirring. The result was a clear solution of about 918 pounds. The solution was spray dried to yield about 460 pounds of calcium lysine complex containing approximately 40% lysine.

EXAMPLE 4

A 1:1 calcium lysine complex was prepared according to the following procedure: 235 pounds of lysine HCL was added to 400 pounds of water and heated to 200° F. with constant stirring. After the lysine had completely dissolved, 145 pounds of a 31.4% w/w solution of hydrochloric acid was slowly added with continued stirring. Next, 100 pounds of calcium hydroxide containing 52% calcium was added to the solution with continued stirring. The result was a clear solution of about 880 pounds. The solution was spray dried to yield about 370 pounds of calcium lysine complex containing approximately 49% lysine.

EXAMPLE 5

A 1:1 calcium methionine complex was prepared according to the following procedure: 2,000 pounds of calcium chloride containing 28.3% calcium was added to 5,000 pounds of water and heated to 200° F. with constant stirring. After the calcium chloride had completely dissolved, 2,000 pounds of d,1-methionine was slowly added with continued stirring. The result was a clear solution of about 9,000 pounds. The solution was spray dried to yield about 3,920 pounds of calcium methionine complex containing approximately 50% methionine.

EXAMPLE 6

A 1:1 calcium methionine complex was prepared according to the following procedure: 150 pounds of a 31.4% solution of hydrochloric acid was added to 300 pounds of water and heated to 200° F. with constant stirring. Next, 195 pounds of d,1-methionine was slowly added with continued stirring. To this solution was added 100 pounds of calcium hydroxide containing 52% calcium. The result was a clear solution of about 745 pounds. The solution was spray dried to yield about 290 pounds of calcium methionine complex containing approximately 65% methionine.

EXAMPLE 7

A 1:2 calcium methionine complex was prepared according to the following procedure: 43 pounds of calcium chloride containing 28.3% calcium was added to 100 pounds of water and heated to 200° F. with constant stirring. After the calcium chloride had completely dissolved, 85 pounds of d,1-methionine was slowly added with continued stirring. To this solution was added 45 pounds of a 50% w/w solution of sodium hydroxide with continued stirring. The result was a clear solution of about 273 pounds. The solution was spray dried to yield about 140 pounds of calcium methionine complex containing approximately 56% methionine.

EXAMPLE 8

A 1:2 calcium methionine complex was prepared according to the following procedure: 195 pounds of d,1-methionine was slowly added to 300 pounds of water and heated to 200° F. with constant stirring. To this mixture was added 50 pounds of calcium hydroxide containing 52% calcium. The result was a clear solution of about 545 pounds. The solution was spray dried to yield about 219 pounds of calcium methionine complex containing approximately 87% methionine.

EXAMPLE 9

A 1:1 magnesium methionine complex was prepared according to the following procedure: 200 pounds of magnesium sulfate containing 9.8% magnesium was added to 300 pounds of water and heated to 200° F. with constant stirring. After the magnesium sulfate had completely dissolved, 115 pounds of d,1-methionine was slowly added with continued stirring. The result was a clear solution of about 615 pounds. The solution was spray dried to yield about 205 pounds of magnesium methionine complex containing approximately 53% methionine.

EXAMPLE 10

The above prepared compounds of certain of the examples were utilized to demonstrate rumen stability of the 1:1 and 1:2 calcium and magnesium lysine and methionine salts. In particular, rumen stability of the protected amino acid products was assessed using an in vitro method that simulated rumen fermentation.

The in vitro method utilized rumen fluid collected from two ruminally cannulated steers fed a 50:50 forage:concentrate diet (to simulate a diet fed to lactating dairy cows). The collected rumen fluid was filtered through eight layers of cheesecloth and then mixed with McDougall's artificial saliva (without urea) on an equal volume basis. The mixed inoculum was pre-warmed to 39° C. and maintained under anaerobic conditions.

Test samples were added to 125 ml Erlenmeyer flasks in an amount to provide 75 mg of N. Seventy-five milliliters of mixed inoculum were then added to each flask. At hours 0, 3, 6, 9, 12, 18 and 24, a 5 ml sample was removed from each flask. Fermentation was stopped by adding 0.5 ml of 5% mercuric chloride to each sampling. After removing the 5 ml sample, 5 ml of McDougall's artificial saliva (prewarmed to 39° C. and maintained under anaerobic conditions) was added to the incubation flask to maintain volume. Samples were centrifuged at 20,000×g for 20 minutes and the supernant analyzed for ammonia-N ($NH_3$—N) using the procedure outlined by Chaney and Marbach (J. Clinical Chem. 8:130–132, 1962).

Percent of product not degraded during incubation was calculated in the following manner:

$$\text{mg } NH_3/dl \times .75 \, dl = \text{mg } NH_3 - N \text{ present in flask}$$

$$\frac{\text{mg } NH3 - N}{17 \text{ g/mole of ammonia}} \times 14 \text{ g/mole of nitrogen} = \text{mg total N loss}$$

$$\frac{\text{mg of sample N present} - \text{mg total N loss}}{\text{mg of sample N present}} \times 100 = \% \text{ of product not degraded during incubation}$$

where:

mg of sample N present is 75 mg N minus the amount of N removed with previous samples Results listed in the table below indicate that after the 24-hour incubation more than 99.2% of the methionine #1, #2, #3, and #4 products remained intact, and greater than 96.6% of the lysine #1, #2, #3, and 4 products remained intact. Percent of urea not degraded during the 24-hour incubation was 8.4%, indicating a viable incubation. Most of the urea was degraded in the first 3 hours of incubation. The results of this in vitro experiment indicate that the protected amino acid products are stable in a rumen-like environment.

TABLE 1

VIABILITY OF RUMEN-PROTECTED AMINO ACID

| Sample | $NH_3$ reading at various timepoints during incubation | | | | | | | % of product not degraded during 24 hours of incubation |
|---|---|---|---|---|---|---|---|---|
| | 0 | 3 | 6 | 9 | 12 | 18 | 24 | |
| Blank | 2.59 | 2.96 | 3.40 | 4.40 | 4.65 | 4.97 | 3.79 | NA |
| Urea | 2.91 | 114.98 | 106.66 | 104.02 | 94.59 | 87.78 | 80.22 | 8.4 |
| Methionine #1 | 1.32 | 0.81 | 0.53 | 0.51 | 0.91 | 0.80 | 0.72 | 99.4 |

TABLE 1-continued

VIABILITY OF RUMEN-PROTECTED AMINO ACID

| Sample | NH₃ reading at various timepoints during incubation | | | | | | | % of product not degraded during 24 hours of incubation |
|---|---|---|---|---|---|---|---|---|
| | 0 | 3 | 6 | 9 | 12 | 18 | 24 | |
| Methionine #2 | 0.40 | 0.39 | 0.42 | 0.56 | 1.05 | 0.99 | 0.96 | 99.2 |
| Methionine #3 | 2.07 | 0.61 | 0.40 | 0.47 | 0.85 | 0.79 | 0.96 | 99.2 |
| Methionine #4 | 0.92 | 0.64 | 0.58 | 0.69 | 1.02 | 0.92 | 0.97 | 99.2 |
| Methioxiine #5 | 0.92 | 0.42 | 0.50 | 0.58 | 1.05 | 0.88 | 1.00 | 99.2 |
| Lysine #1 | 1.43 | 2.05 | 2.31 | 2.73 | 3.19 | 3.52 | 4.02 | 96.7 |
| Lysine #2 | 1.15 | 1.83 | 1.97 | 2.98 | 2.94 | 3.66 | 3.85 | 96.8 |
| Lysine #3 | 1.25 | 1.81 | 1.79 | 2.51 | 2.70 | 3.29 | 2.78 | 97.7 |
| Lysine #4 | 1.32 | 1.70 | 1.73 | 2.42 | 2.57 | 3.23 | 4.09 | 96.6 |

Looking at the data of Table 1, it can be seen that very little degradation of product occurred in the rumen fermentation environment indicating the stability. Follow-up testing demonstrated the animal availability of lysine or methionine.

In making nutritional supplements for the addition of these compositions to the diets of animals, it is preferred that the complexes of the present invention be added to a carrier or filler material for processability, ease of handling and sale. They can, however, also be sold as spray dried powders without any carrier. The use of a carrier or not is a preference of the processing manufacturer and feed supplier. If carriers are used, examples of suitable carriers include distillers' fermentation solubles, feed grains, corn cob flour, whey, and other cellulosic carrier materials, all well known in use for carrying trace mineral preparations.

The amount of supplement added to the feed ration will, of course, depend on whether one is using the pure spray dried powders, or whether it is being used with a carrier, such as corn cob flour. Basically, the supplement will simply be mixed in with the feed ration as sold.

Generally, the complexes should be supplemented at a level to provide from about 1 g to about 50 g of each amino acids used per animal per day.

It therefore can be seen that the invention accomplishes all of its stated objectives.

What is claimed is:

1. A composition which is rumen stable, but intestine soluble, for use in providing essential amino acids to ruminants comprising:

a non-toxic carrier; and a calcium or magnesium complexed salt of an essential amino acid;

wherein the calcium or the magnesium is complexed with the essential amino acid in a ratio of 1:1 or 1:2; and further providing that the complexed salt includes a coordination bond between the calcium or magnesium and amino group of the essential amino acid.

2. A composition of claim 1 wherein the essential amino acid is lysine.

3. A composition of claim 1 wherein the essential amino acid is methionine.

4. A method of dietary supplementation of ruminants with bioavailable and rumen-stable essential amino acids, comprising:

feeding, as a dietary supplement of essential amino acids a diet supplementing effective amount of a complexed salt of salts of calcium or magnesium complexed with an essential amino acid in a ratio of 1:1 or 1:2; and further providing that the complexed salt includes a coordination bond between the calcium or magnesium and amino group of the essential amino acid.

5. The method of claim 4 wherein supplementation is at a rate of from about 1 g to about 50 g per animal per day of essential amino acids as provided by said complexed salts.

* * * * *